United States Patent [19]

Samarov

[11] Patent Number: 5,156,371
[45] Date of Patent: Oct. 20, 1992

[54] TRIAXIALLY-EQUALIZED ACTION SHOCK MOUNT

[75] Inventor: Victor M. Samarov, Carlisle, Mass.

[73] Assignee: Digital Equipment Corporation, Maynard, Mass.

[21] Appl. No.: 718,502

[22] Filed: Jun. 20, 1991

[51] Int. Cl.$^5$ .............................. F16F 7/00
[52] U.S. Cl. ................... 248/638; 248/560; 267/153
[58] Field of Search ............. 248/638, 636, 560, 604, 248/597; 267/153, 292, 141

[56] References Cited

U.S. PATENT DOCUMENTS

| | | |
|---|---|---|
| 961,312 | 6/1910 | Nolen et al. ............ 267/292 |
| 1,387,288 | 8/1921 | Menefee . |
| 1,540,300 | 6/1925 | Altman et al. . |
| 1,864,080 | 6/1932 | Madge . |
| 1,876,812 | 9/1932 | Wiley et al. . |
| 1,948,193 | 2/1934 | Thompson . |
| 1,964,432 | 6/1934 | Geyer . |
| 2,059,313 | 11/1936 | Carter . |
| 3,353,771 | 11/1967 | Te Bow . |
| 3,363,870 | 1/1968 | Olson . |
| 3,401,911 | 9/1968 | Lazan . |
| 3,455,546 | 7/1969 | Shanok et al. . |
| 3,679,159 | 7/1972 | Bach et al. . |
| 4,036,759 | 7/1977 | Donovan . |
| 4,232,563 | 11/1980 | Peterson et al. . |
| 4,288,063 | 9/1981 | Brenner et al. . |
| 4,619,349 | 10/1986 | Braun . |
| 5,044,598 | 9/1991 | Mann et al. ............ 248/638 |

OTHER PUBLICATIONS

P. 45, "Series 500—Rectangular Mountings", from *Uniroyal* catalog, undated.
P. 1, "Vibration Mount Round Double Stud", from Catalog of *Minor Rubber Co., Inc.*, undated.
P. 13, no heading, from *Lord* catalog, undated.
Page unknown, "Taylor Fluidshoks ®" from *Taylor* catalog, undated.
P. 3, "Equipment Foot" and p. 8, Ring And Bushing Products, from *Barry Controls* catalog, undated.

*Primary Examiner*—Alvin C. Chin-Shue
*Attorney, Agent, or Firm*—Ronald E. Myrick; Barry N. Young; Ronald C. Hudgens

[57] ABSTRACT

A triaxially-equalized action shock and vibration-insulation mount is provided for the protection of a dynamic load-sensitive component, such as a mass-storage device, from external multidirectional dynamic loads above a predetermined magnitude. A substantially uniform, attenuated response of the component to such dynamic loads is the result, regardless of the direction of application of the loads. In order to achieve substantially uniform reactions to such external loads applied along any of the three orthogonal spatial axes, and further in order to achieve higher structural integrity of the mount by reducing flexural, tensile and/or shear stresses, the shock mount comprises a body of elastic, preferably foamed elastomer material, which is confined at its periphery in a rigid, stationary shell, substantially symmetrical relative to the orthogonal spatial axes and partially open at one side. The elastic material body is shaped at its geometrical center to provide a tight, e.g., spherical, socket for an enlarged symmetrical, e.g. spherical, end portion of a rigid rod extending outward from said socket, through the partially open side of the shell, into rigid connection with the load-sensitive component. The elastic material of the body is stressed primarily in compression along each of its axes. The elastomeric material may alternatively be constituted by a plurality of relatively small-diameter tightly randomly packed, solid elastic spheres.

5 Claims, 2 Drawing Sheets

TRIAXIALLY-EQUALIZED ACTION SHOCK MOUNT

BACKGROUND OF THE INVENTION

1. Field of the Invention

The present invention relates generally to apparatus for isolating a component from mechanical shock and vibration and, more particularly, to such a device which is uniformly effective in all directions and in which the primary application of stress is in compression.

2. Description of the Prior Art

It has been a goal to isolate certain items against mechanical chock and vibration while adequately supporting such items. Because of the generally complex and fragile nature of electronic circuitry and components, electronic equipment is a prime candidate for such a requirement. The prior art is replete with examples of constructions for providing isolative support for a variety of items. Some of these examples are very old, which is a clear indication that the problem has existed for a long time.

Typical of an early construction is Madge U.S. Pat. No. 1,864,080 which discloses a "cushioned" connection tie for the "non-vibration" transmission of an axial force in a manner eliminating metal-to-metal contact. In this instance, a threaded stud has an enlarged head disposed in a housing and embedded in an elastic material, rubber, which fills all the voids in the housing.

Another early concept is disclosed in Thompson U.S. Pat. No. 1,984,193 which discloses a resilient mounting for sewing machines. The resilient mounting utilizes a sleeve cylinder of cork supported in opposed metal caps. As with the Madge construction, it is effective primarily in one direction only.

Geyer U.S. Pat. No. 1,964,432 discloses an engine mount broadly similar to the Thompson construction. Geyer utilizes a flange on a metal sleeve to be isolated, the flange being embedded in a resilient rubber block which is substantially encapsulated within a metal cup.

A more recent engine mount is disclosed in Clem Te Bow U.S. Pat. No. 3,353,771 which provides an engine mounting system utilizing ball and socket type shock mounts. In this instance, balls on either end of a telescoping tube are rollingly engaged with mating metallic sockets. There is no yielding between each ball and its mating socket. The yielding occurs in the telescoping tube and in a resilient pad interposed between the ball and socket shock mount and the engine to be cushioned.

Olson U.S. Pat. No. 3,363,870 discloses a construction utilizing plastic bodies for a variety of uses, including damping. The construction employs gas or liquid filled bubbles contained within an outer skin. However, there is no disclosure or suggestion of providing damping in a plurality of directions. In a moderately similar type of construction, Shanok et al. U.S. Pat. No. 3,455,546 discloses an impact resistant structural ember which comprises a shell composed of a resilient impact resistant material and a core comprising rigid foams, such as styrofoam. Again, there is no disclosure or suggestion in the patent of providing multi-directional absorption of an impact.

It was in light of the foregoing that the present invention has been conceived and is now reduced to practice.

SUMMARY OF THE INVENTION

The present invention has been devised in order to overcome the disadvantages of the prior art mounts, to achieve the approximate uniformity of the shock mount's reactions to external loads applied along any of the free orthogonal spatial axes, and to ensure an increased structural integrity of the mounts. To these ends, a triaxially-equalized action shock and vibration-insulation mount is provided for the protection of a dynamic load-sensitive component, such as a mass-storage device, from external multidirectional dynamic loads above a predetermined magnitude. A substantially uniform, attenuated response of the component to such dynamics loads is the result, regardless of the direction of application of the loads. In order to achieve substantially uniform reactions to such external loads applied along any of the three orthogonal spatial axes, and further in order to achieve higher structural integrity of the mount by reducing flexural, tensile and/or shear stresses, the shock mount comprises a body of elastic, preferably foamed elastomer material, which is confined at its periphery in a rigid, stationary casing, substantially symmetrical relative to the orthogonal spatial axes and partially open at one side. The elastic material body is shaped at its geometrical center to provide a tight, e.g., spherical, socket for an enlarged symmetrical, e.g. spherical, end portion of a rigid rod extending outward from said socket, through the partially open side of the casing, into rigid connection with the load-sensitive component. The elastic material of the body is stressed primarily in compression along each of its axes. The elastomeric material may alternatively be constituted by a plurality of relatively small-diameter tightly randomly packed, solid elastic spheres.

The shock mount of the invention employs a construction wherein the insulating elastic material is stressed primarily in compression and not in tension or shear, effectively preventing a catastrophic structural failure of the mount in severe conditions, in contrast to many thin wall mounts of the prior art in which the elastic material is loaded in shear and tension.

The mount of the invention is of simplified design, easily manufactured, and constructed of readily available materials. It can be mounted to a broad range of instruments and the like to be protected against mechanical shock and vibration.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENTS

Figure 1:
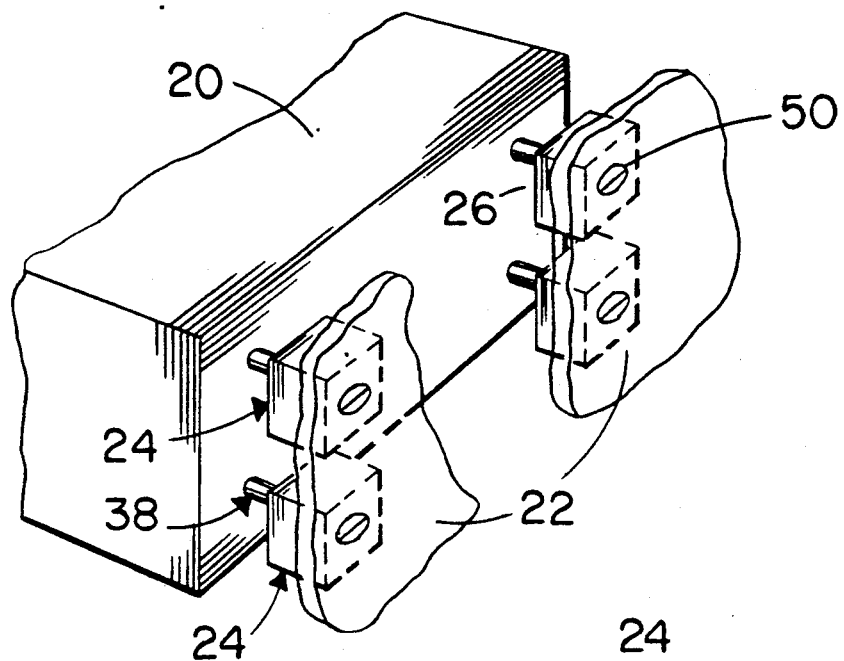
FIG. 1 is a perspective view, certain parts being cut away for clarity, illustrating an application of a mechanical shock and vibration isolating device embodying the invention.

Turn now to the drawings and, initially, to FIG. 1 which generally illustrates a construction utilizing the present invention. As depicted in FIG. 1, a chassis or housing 20 of a component which may be, for example, a relatively fragile electronic instrument is mounted on supporting structure 24 embodying the invention serves to mount the housing 20 to the supporting structure 22 such that the instrument is protected against external multidirectional dynamic loads above a pre-specified magnitude regardless of the direction of application of the load.

Figure 2:
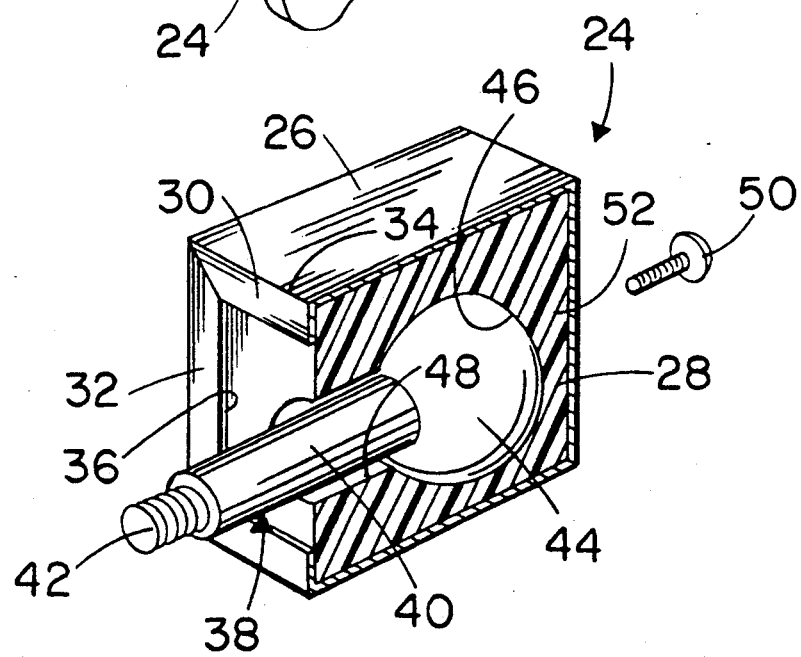
FIG. 2 is a perspective view, certain parts being cut away and shown in section, illustrating in more detail the shock and vibration isolating device of the invention.

In a first embodiment of the invention, depicted in FIG. 2, a first mounting member is provided in the form of a relatively rigid metal casing 26, i.e., for example, composed of sheet metal and generally in the form of a cube.

The casing 26 serves to receive an internal member 28 composed of closed cell foam elastic material 28 which substantially fills the interior of the casing. The internal member 28 may be preformed, then inserted into the casing 26 through an open end following which flaps 30, 32 on the casing 26 are folded about bend lines 34 to the position illustrated in FIG. 2 to thereby capture the internal member within the casing. In the alternative, the internal member 28 may be totally formed within the casing 26 in a suitable manner. In any event, the flaps 30, 32 which retain the internal member 28 in place within the casing 26, define an opening 36 into the interior of the casing.

The isolating device 24 which, in fact, is a joint mechanism, also comprises an elongated bearing rod 38 which includes a shank 40 extending between a free end 42 which may be suitably threaded for fastening engagement with the housing 20 and, oppositely, an enlarged, triaxially symmetrical, for example, spherical, end 44. As can be clearly seen in FIG. 2, the foam elastic material of the internal member 28 substantially envelopes the enlarged end 44 and defines an internal cavity 46 which is slightly smaller in diameter than that of the enlarged end 44 to create an interference fit. The internal cavity 46 is centrally located relative to the casing 26 such that the distance between the enlarged end 44 and the casing 26 in directions along and perpendicular to the longitudinal axis are substantially the same.

In addition to the cavity 46, the internal member 28 also defines a radially extending passage 48 which connects the cavity and the opening 36 of the casing 26 so as to receive the shank 40 therethrough. Optionally, there may be sufficient clearance between the shank 40 and the passage 48 to allow for limited rotational movement of the bearing rod 38 on the enlarged end 44.

It was earlier noted that the free end 42 of the shank 40 can be threadedly engaged with the housing 20 for firm attachment thereto of the isolating device 24. The casing 26 may, in turn, be attached to the supporting structure 22 as by a fastener 50 extending through a suitable mounting hole 51 (FIG. 3) in the supporting structure 22 and being threadedly engaged with a tapped hole 52 in the casing.

In this manner, the bearing rod 38 is rigidly attached to the housing 20 and the casing 26 is rigidly attached to the supporting structure 22. However, by reason of the interface between the enlarged end 44 and the cavity 46 of the internal member 28, shock and vibration imparted by the supporting structure to the housing 20 is substantially absorbed by the internal member 28. Furthermore, by reason of the design of the isolating device 24, such dynamic loading is triaxially equalized. That is, the isolating device 24 is capable of protecting the instrument defined by the housing 20 against shock and vibration to substantially the same extent in all three mutually perpendicular directions. This result is achieved by reason of the interface between the enlarged end 44 and the cavity 46 and such triaxially equalized vibration protection action of the isolating device 24 is only slightly diminished along an axis of the shank 40 by reason of the passage 48.

As can be further seen from FIG. 2, the loaded, reaction-generating parts of the isolating device 24 are stressed primarily in compression in a confined volume. This assures a high degree of mechanical integrity of the device compared to the prior art constructions which frequently utilized thin walled members loaded in tension, flexure, and/or shear.

Figure 3:
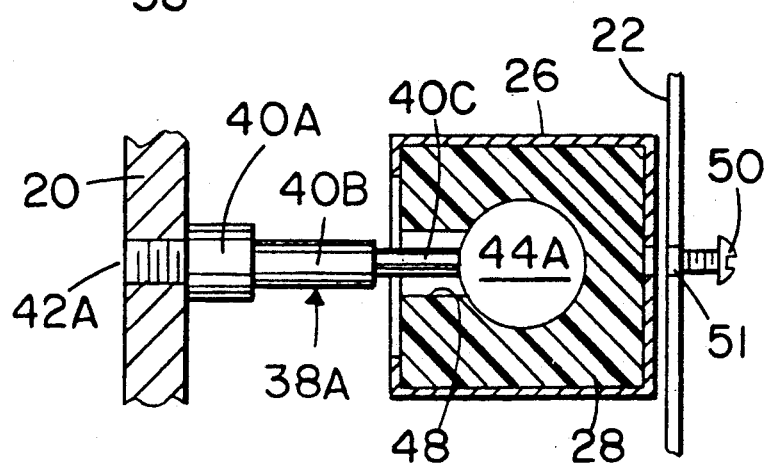
FIG. 3 is a side elevation view, partly exploded and partly in section, depicting another embodiment of the invention.

Another embodiment of the invention is illustrated in FIG. 3. In this instance, a modified bearing rod 38A is of variable cross section as indicated by shank parts 40A, 40B, and 40C. It will be appreciated that by reason of the reduced diameter of shank part 40C, as compared to that of shank 40 (FIG. 2), the diameter of the passage 48 can be substantially reduced, thereby significantly increasing the bearing area between the internal member 28 and the surface of the enlarged end 44A. In this manner, the triaxial symmetry of the isolating device 24 is even further enhanced. Of course, it will be appreciated that the illustration in FIG. 3 is diagrammatic and that, in actual fact, interfaces between the shank parts 40A, 40B, and 40C would be rounded to prevent stress concentrations between them.

Figure 4:
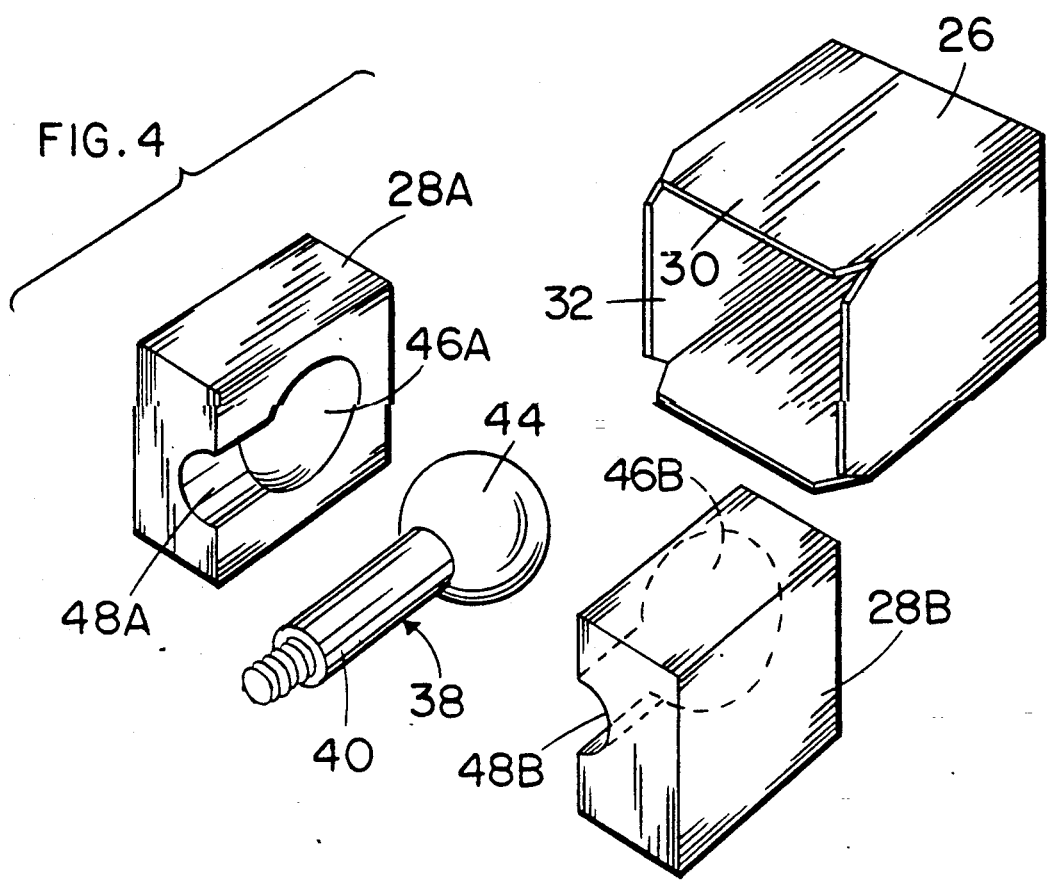
FIG. 4 is a perspective exploded view illustrating still another embodiment of the invention.

Still another embodiment of the invention is illustrated in FIG. 4 in which the internal member comprises two separately molded, identical halves 28A and 28B, assembled first around the enlarged end 44 of bearing rod 38 and then, in such an assembled state, inserted into the interior of the casing 26. Each internal member half, 28A, 28B, defines internal cavity halves 46A, 46B and passage halves 48A, 48B. When assembled, these cavities and passages together form the equivalent of the internal cavity 46 and passage 48 of the first embodiment (FIG. 2). with the assembly of the two internal halves 28A, 28B, and bearing rod 38 positioned within the casing 26, as previously described, the flaps 30, 32 are folded down to the position indicated in FIG. 2 so as to fully constrain the internal member halves within the casing. Once assembled, the embodiment of FIG. 4 operates in the identical fashion to that of FIG. 2.

Figure 5:
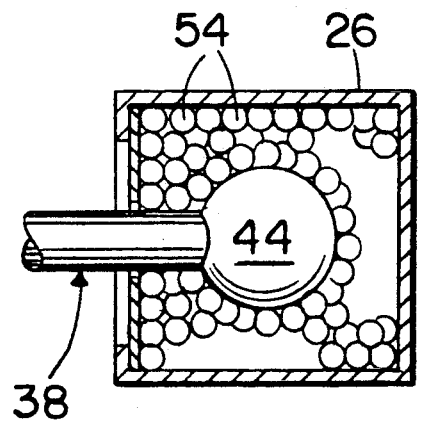
FIG. 5 is a side elevation view, partly in section, illustrating yet another embodiment of the invention.

Still another embodiment of the invention is illustrated in FIG. 5. In this embodiment, the internal member 28 is replaced with a plurality of relatively small diameter, solid elastic spheres 54 randomly filling the volume between the casing 26 and the enlarged end 44. The advantage of this embodiment is in the friction which occurs between the spheres during the relative motion of the bearing rod 38 and casing 26, thus providing an additional source of damping to the oscillating system. By changing the material, surface finish, and size of the spheres 54, both force-deflection and damping characteristics of the isolating device 24 can be optimized for maximum isolation of the housing 20.

The foregoing description is only illustrative of the invention. Various alternative and modifications can be devised by those skilled in the art without departing from the invention. Accordingly, the present invention is intended to embrace all such alternatives, modifications and variances which fall with the scope of the appended claims.

What is claimed is:

1. A shock and vibration isolating device for mounting a component on a supporting structure comprising:
    first mounting means for attachment to the supporting structure including a substantially rigid casing having an opening into the interior thereof;
    second mounting means for attachment to the component including an elongated bearing rod having a longitudinal axis extending between a first end having fastening means for attachment to the component and a second enlarged spherical end, said bearing rod including at least first and second coaxial shank members, said first shank member being integral with and adjacent said enlarged end, said second shank member being integral with said first shank member and integral with and adjacent said fastening means, said first shank member having a smaller cross section than said second shank member; and
    compressively yieldable joint means interconnecting said first and second mounting means for absorbing relative movement between said first and second mounting means with substantially equalized reaction force occurring in all directions, said joint means including closed cell foam elastic material substantially filling the interior of said casing and defining a cavity for slidable reception therein of said enlarged end of said bearing rod and having a radially extending passage connecting the cavity and the opening in said casing for receiving said first shank member therethrough, the radially extending passage and the opening in said casing being of substantially larger cross section than that of said first shank member to accommodate limited transverse movement of said bearing rod.

2. A shock and vibration isolating device as set forth in claim 1
    wherein said bearing rod is substantially cylindrical; and
    wherein the radially extending passage is substantially cylindrical and coaxial with said bearing rod.

3. A shock and vibration isolating device as set forth in claim 1
    wherein said enlarged end of said bearing rod is a solid sphere.

4. A shock and vibration isolating device for mounting a component on a supporting structure comprising:
    first mounting means for attachment to the supporting structure including a substantially rigid casing having an opening into the interior thereof;
    second mounting means for attachment to the component including an elongated bearing rod having a longitudinal axis including a shank extending between a first end having fastening means for attachment to the component and a second enlarged spherical end, said bearing rod including at least first and second coaxial shank members, said first shank member being integral with and adjacent said enlarged end, said second shank member being integral with said first shank member and adjacent said fastening means, said first shank member having a smaller cross section than said second shank member; and
    compressively yieldable joint means interconnecting said first and second mounting means for absorbing relative movement between said first and second mounting means with substantially equalized reaction force occurring in all directions, said joint means including first and second joint members composed of closed cell foam elastic material enveloping said enlarged end of said bearing rod and, except in the region of said bearing rod, substantially filling the interior of said casing, each of said first and second joint members having an interface surface, a first substantially hemispherical cavity in said interface surface substantially congruent with one half of said enlarged end for mating reception thereof, and a second elongated cavity shaped for substantial reception of one half of the portion of said first shank member coextensive with said joint means, the first and second cavities of said first and second joint members being cooperatively juxtaposed when said interface surfaces of said first and second joint members are contiguously positioned, the second elongated cavities together being of substantially larger cross section than that of said first shank member to accommodate limited transverse movement of said bearing rod.

5. A shock and vibration isolating device as set forth in claim 4
    wherein said bearing rod is substantially cylindrical;
    wherein each of the second cavities in each of said first and second joint embers is semi-cylindrical.

* * * * *